(No Model.)
W. S. COON.
CORN PLANTER.
No. 597,827. Patented Jan. 25, 1898.
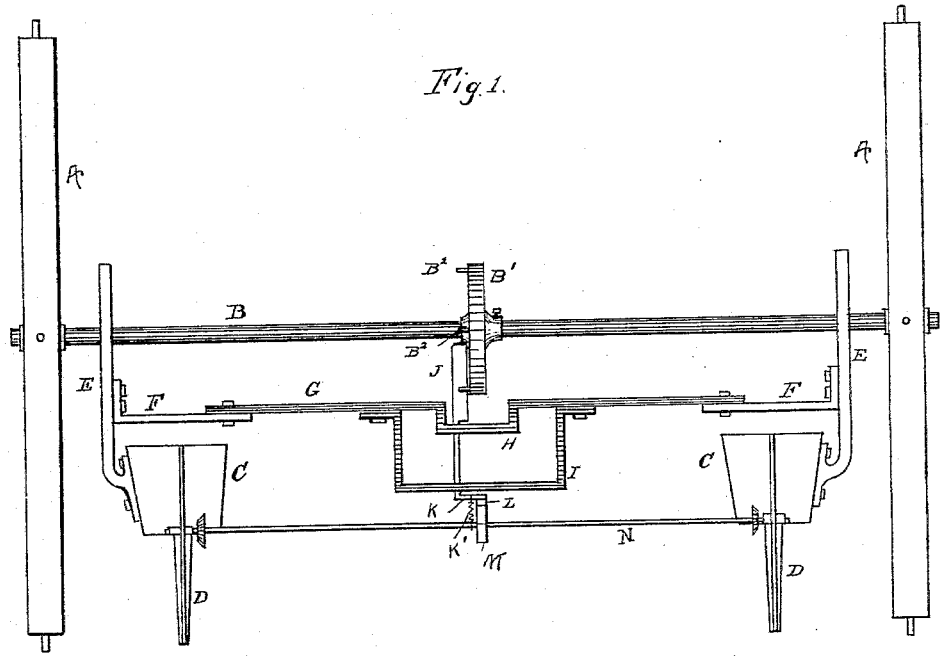
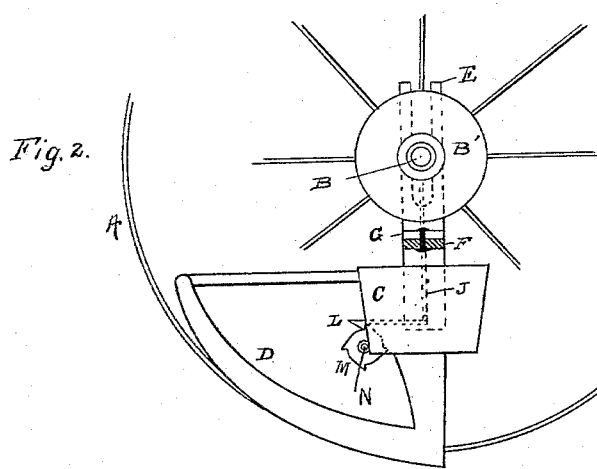
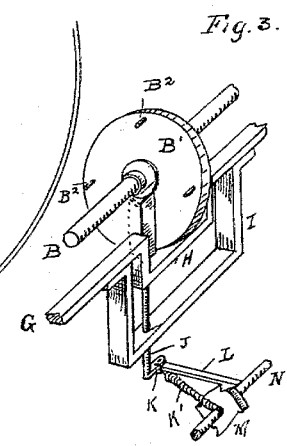
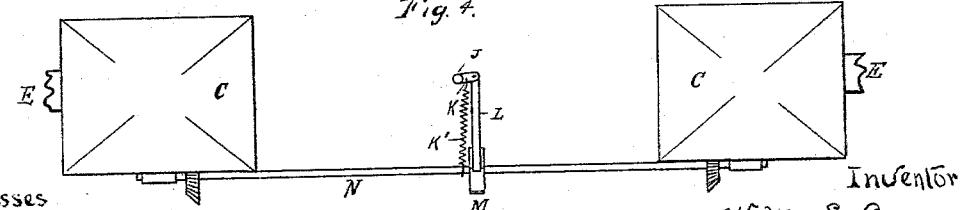
Witnesses
a. Keithley
C. Johnson
Inventor
Walter S. Coon
By L. M. Thurlow, Atty

UNITED STATES PATENT OFFICE.

WALTER S. COON, OF PEORIA, ILLINOIS.

CORN-PLANTER.

SPECIFICATION forming part of Letters Patent No. 597,827, dated January 25, 1898.

Application filed June 19, 1897. Serial No. 641,400. (No model.)

*To all whom it may concern:*

Be it known that I, WALTER S. COON, a citizen of the United States, residing at Peoria, in the county of Peoria and State of Illinois, have invented certain new and useful Improvements in Corn-Planters; and I do hereby declare that the following is a full, clear, and exact description of the invention, which will enable others skilled in the art to which it appertains to make and use the same.

This invention relates to improvements in corn-planters, and has for its object to do the planting by the revolving carrying-wheels. Furthermore, the object is to provide a simple construction in acquiring this purpose. I am aware that the idea of planting from the wheels is not new, however, but what I do regard as new is the construction and operation of the machine, and which may be fully understood from the following description.

In the drawings herewith, Figure 1 is a front elevation of the planter. Fig. 2 is an end elevation of the planter in part section. Fig. 3 is a perspective view of a portion of the planter, showing operating portions. Fig. 4 is a plan view of the seed-boxes and part of the operating portions.

The carrying-wheels are indicated by A, which are mounted on the shaft B. The seedboxes C are mounted in the usual manner on runners D. Upon the outer side of each box is secured a vertical fork E, which straddles the shaft B, acting as a guide in the vertical movement of the planter in traversing uneven ground. Secured to each vertical fork is a horizontal support F. A horizontal beam G rests at each end upon one of the supports F, and is secured thereto by bolts allowing of vertical adjustment.

At the middle of its length the beam G is constructed with a downwardly-projecting stirrup H, while a second larger stirrup I is bolted to said beam G immediately beneath the stirrup H.

A vertical rod J is journaled in the stirrups H and I substantially in the position shown and whose upper extremity is flattened and made to project considerably beyond the journaled portion, so that a leverage may be obtained and the rod thereby made to easily swing in its bearings. The lower end of the said rod carries an arm K, to the end of which is pivoted an arm L, having a projecting tooth or claw upon its free end to engage the dropping mechanism to be described. Upon the shaft B at about the middle of its length is secured a wheel B', having a series of pins or projections B² upon its surface adjacent to the vertical rod J. The said wheel B' is made adjustable on the shaft, but fixed with regard to same when in its operative position, so that the dropping mechanism may be adapted to operate at any interval with reference to the driving-wheels.

Upon the periphery of the bearing-wheels at intervals are fixed pins or projections which form guides in planting and which correspond with the projections on the wheel B'—that is, at every planting each of the pins mark the ground and when planting the next row the pins must retrace the markings thus made.

My device may be used on any style of planter, but the form I have shown here to illustrate the workings is the rotary drop, which may be understood from what follows. A shaft N is journaled on the seedboxes, as shown, and carries a toothed wheel M, the teeth of which are engaged by the arm L. A spring K', attached to the arm K, has a sliding connection with the shaft N for returning the rod J and arms K and L to their normal position after each movement. The friction between the shaft and spring is so light as to offer no resistance of any moment to the driving power. The said shaft N carries a gear-wheel near either end to operate the seed-droppers within the boxes.

Operation: A point is selected in the field from which to start, and one of the projections or indicators on the wheel-rim is placed upon that point. The planter is started ahead, and at the moment when the succeeding point touches the ground the pin on the wheel B' corresponding strikes and swings the upright rod J to a position about at right angles to the first position, thus giving the rod L a longitudinal movement, which imparts to the wheel M and shaft N a partial revolution, thereby giving movement to the seed-droppers within the seedboxes, after which the spring K' returns the rod J and arm L to their first positions ready for a second manipulation. The forked rods E permit the wheels A to rise and fall with the unevenness of the ground, while the seedboxes retain their normal level, and for this reason the flattened portion of the said rod J is elongated to permit the wheel B' to have large vertical movement and still accomplish its work without a chance of loosing a single operation.

The points of advantage in my planter are easily understood both as to construction, simplicity of operation, and of permitting the machine to traverse all levels without missing a planting. It is very easy for the operator to watch the mark of the wheels, and when the indicators do not correspond the wheel may be revolved upon the shaft B by a strong pull of the hand, easily swung as the machine proceeds, and the mark made to agree with the row being planted.

I claim—

1. In a corn-planter, the carrying-wheels A A, the shaft B, the revolving wheel B' being either fixed or adjustable on said shaft, a series of pins or projections B² on one of the surfaces of said wheel B', the seedboxes mounted on runners, the vertical forked arms E secured to the seedboxes, their free ends embracing the said shaft B, horizontal supports F secured to the said vertical forked arms, the adjustable beam G secured to the said supports the depending stirrup H formed with said beam G, the stirrup I secured to the said beam beneath the said stirrup H, the vertical swinging rod J having bearings in the said stirrups, its upper extremity being in close relation to said wheel B', an arm K, secured at one end, to the lower end of said rod J, a toothed arm L pivoted to the arm K, in combination with a shaft N journaled on the seedboxes, a toothed wheel M on said shaft and engaged by said arm L and a spring K' all arranged substantially as and for the purposes set forth and described.

2. In a corn-planter, the combination of the carrying-wheels A A, a series of marking points or projections on the periphery thereof, a shaft for the wheels and to which they are secured, an adjustable wheel on the shaft and fixed when in its operative position, a series of pins or fingers on the face of the said wheel, a pair of runners, seedboxes mounted thereon, vertical guides affixed to the seedboxes, an adjustable frame secured to said guides, a swinging rod or lever perpendicularly supported in said frame adjacent to and operated by the said fingered wheel, an arm secured at right angles to or forming part of said lever or rod at the lower extremity thereof, a pawl pivoted to said arm, a rotating shaft having bearings on the seedboxes, a toothed wheel upon said shaft, adapted to be engaged by the pawl, a spring between the shaft and arm carrying the pawl, and dropping mechanism within the said boxes operated by the said rotating shaft, all for the purposes set forth and described.

In testimony whereof I affix my signature in presence of two witnesses.

WALTER S. COON.

Witnesses:
J. H. BLUSCH,
A. KEITHLEY.